(12) United States Patent
Kaushik et al.

(10) Patent No.: US 11,756,251 B2
(45) Date of Patent: Sep. 12, 2023

(54) FACIAL ANIMATION CONTROL BY AUTOMATIC GENERATION OF FACIAL ACTION UNITS USING TEXT AND SPEECH

(71) Applicant: Sony Interactive Entertainment Inc., Tokyo (JP)

(72) Inventors: Lakshmish Kaushik, San Mateo, CA (US); Saket Kumar, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 13 days.

(21) Appl. No.: 17/396,664

(22) Filed: Aug. 7, 2021

(65) Prior Publication Data

US 2022/0068001 A1    Mar. 3, 2022

Related U.S. Application Data

(60) Provisional application No. 63/074,310, filed on Sep. 3, 2020.

(51) Int. Cl.
| | |
|---|---|
| *G06T 13/40* | (2011.01) |
| *G06N 20/00* | (2019.01) |
| *G10L 25/63* | (2013.01) |
| *G06T 13/20* | (2011.01) |

(52) U.S. Cl.
CPC ............ *G06T 13/40* (2013.01); *G06N 20/00* (2019.01); *G06T 13/205* (2013.01); *G10L 25/63* (2013.01)

(58) Field of Classification Search
CPC ....... G06T 13/40; G06T 13/205; G10L 25/63; G10L 21/10; G06N 20/00
See application file for complete search history.

(56) References Cited

U.S. PATENT DOCUMENTS

| | | | | |
|---|---|---|---|---|
| 9,721,373 | B2* | 8/2017 | Marsella | ................. G06T 13/00 |
| 9,812,151 | B1* | 11/2017 | Amini | ...................... G06T 13/40 |
| 10,521,946 | B1* | 12/2019 | Roche | ..................... G10L 13/00 |
| 11,049,332 | B2* | 6/2021 | Loper | ..................... G06T 19/20 |
| 11,069,135 | B2* | 7/2021 | Grabli | ..................... G06T 13/40 |
| 11,120,600 | B2* | 9/2021 | Stoyles | ................ G06V 40/174 |
| 11,404,063 | B2* | 8/2022 | Ishii | ..................... G10L 15/063 |
| 2008/0269958 | A1* | 10/2008 | Filev | .................... A61B 5/4803 |
| | | | | 701/1 |
| 2009/0157625 | A1* | 6/2009 | Jung | ...................... G06Q 30/02 |
| 2010/0082345 | A1* | 4/2010 | Wang | ...................... G10L 13/00 |
| | | | | 704/E21.02 |
| 2011/0131041 | A1* | 6/2011 | Cortez | ................ G10L 21/0356 |
| | | | | 704/235 |
| 2012/0130717 | A1* | 5/2012 | Xu | ........................... G06T 13/40 |
| | | | | 345/473 |
| 2019/0012599 | A1 | 1/2019 | Kaliouby et al. | |
| 2019/0102706 | A1* | 4/2019 | Frank | ..................... G06N 5/046 |

(Continued)

FOREIGN PATENT DOCUMENTS

| | | |
|---|---|---|
| KR | 102078209 B1 | 2/2020 |
| WO | 2020010530 A1 | 1/2020 |

OTHER PUBLICATIONS

"International Search Report and Written Opinion" dated January 102, 2022, issued in PCT application PCT/US21/48870.

*Primary Examiner* — James A Thompson
(74) *Attorney, Agent, or Firm* — John L. Rogitz

(57) ABSTRACT

Text and speech from a computer simulation are processed by a machine learning engine to animate the face of a computer avatar.

16 Claims, 3 Drawing Sheets

(56) References Cited

U.S. PATENT DOCUMENTS

| | | | |
|---|---|---|---|
| 2019/0122411 A1* | 4/2019 | Sachs | G06T 7/73 |
| 2019/0130628 A1* | 5/2019 | Cao | G10L 21/10 |
| 2019/0172458 A1* | 6/2019 | Mishra | G06K 9/6262 |
| 2020/0324072 A1* | 10/2020 | el Kaliouby | A61B 5/165 |
| 2022/0108510 A1* | 4/2022 | Sagar | G10L 15/02 |
| 2022/0148248 A1* | 5/2022 | McIntyre-Kirwin | G06F 3/011 |

\* cited by examiner

FACIAL ANIMATION CONTROL BY AUTOMATIC GENERATION OF FACIAL ACTION UNITS USING TEXT AND SPEECH

FIELD

The application relates generally to facial animation control by automatic generation of facial action units (FAU) Using Text and Speech in computer simulations and other applications.

BACKGROUND

The faces of computerized images of, e.g., computer game avatars are animated during simulation play to provide a realistic effect. As understood herein, an artist typically must painstakingly create the facial animation units (FAU) that are used to animate respective parts of the face on a frame-by-frame basis by emulating the contraction or relaxation of a respective muscle point on a human face.

SUMMARY

An apparatus includes at least one processor configured with instructions to identify an image of a face of a computerized avatar. The instructions are executable to input first modality data related to the avatar to a machine learning (ML) engine, input second modality data related to the avatar to the ML engine, and receive output from the ML engine useful for animating the image of the face of the avatar. The instructions are executable to animate the face of the avatar in accordance with the output.

In some embodiments the output includes facial action units (FAU), with each FAU pertaining to a respective portion of the image of the face. In non-limiting examples, the first modality data includes text and the second modality data includes speech.

In non-limiting examples, the instructions can be executable to derive, using the ML engine, emotion action information from the first and second modality data. The output can be based at least in part on time-aligned word level emotion probabilities produced from the emotion action information.

In another aspect, a method includes training a machine learning (ML) model using a training set of animated faces speaking known words. The method also includes generating an image of a first face to be animated to speak words in accordance with first text. The method further includes inputting the first text to the ML model and animating the image of the first face to speak first words indicated by the first text in accordance with output of the ML model.

In example embodiments, the method can include detecting emotion and sentiment from the first text, aligning the first text with speech representing the first text to render aligned text/speech, and inputting the emotion, sentiment, and aligned text/speech to the ML model. The method also may include inputting a target emotion to the ML module. Example implementations of the method may include receiving first probabilities from the ML modality representing facial action, receiving second probabilities from the ML model representing emotion, and using the first and second probabilities to establish facial action units (FAU). The method can then include animating the image of the first face in accordance with the FAU.

In another aspect, an assembly includes at least one display configured to present an animated computer avatar and at least one processor configured with instructions to execute a machine learning (ML) model. The instructions are executable to receive text indicating speech to be spoken by the avatar, process the text using the ML model to generate facial action units (FAU), and animate the computer avatar in accordance with the FAU.

The details of the present application, both as to its structure and operation, can best be understood in reference to the accompanying drawings, in which like reference numerals refer to like parts, and in which:

DETAILED DESCRIPTION

Figure 1:
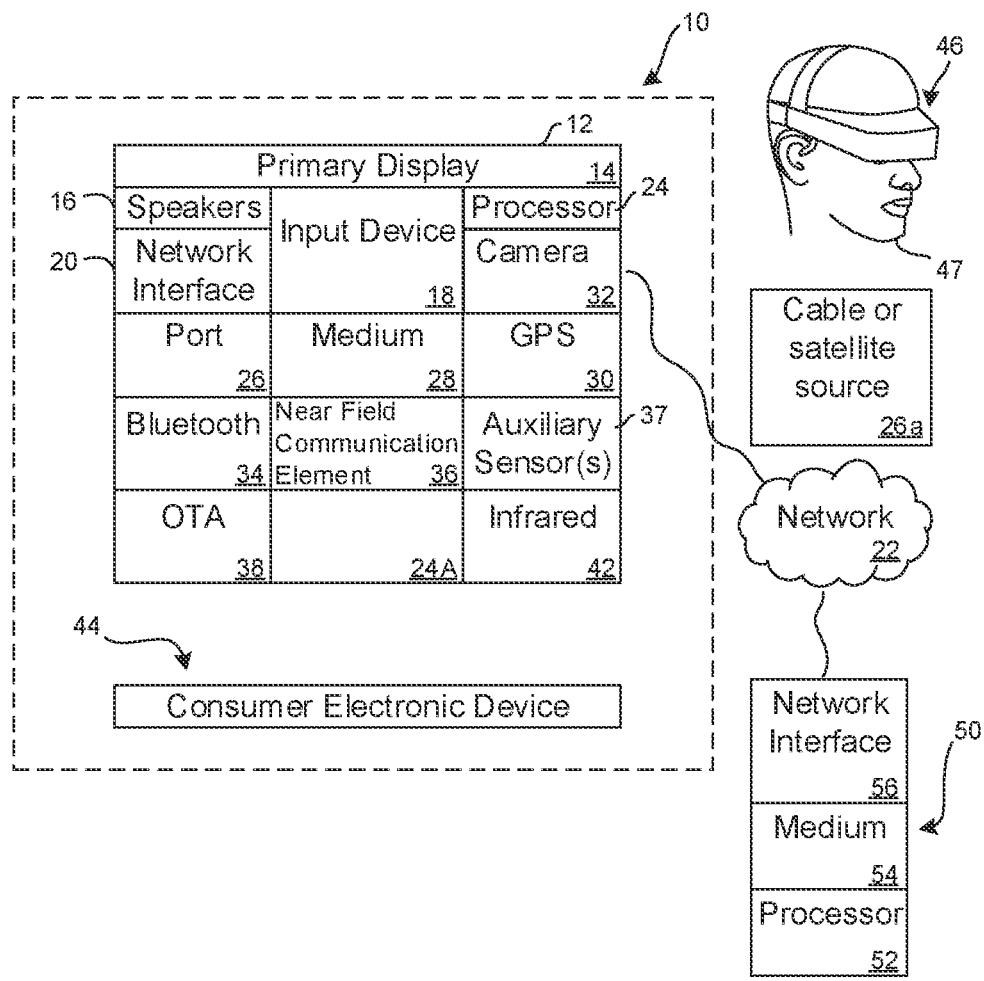
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or, the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be a computer game console that can be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player or a head-mounted display (HMD) worn by a player 47. In the example shown, only two CE devices 44, 46 are shown, it being understood that fewer or greater devices may be used. A device herein may implement some or all of the components shown for the AVD 12.

Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or, the server 50 may be implemented by one or more game consoles or other computers in the same room as the other devices shown in FIG. 1 or nearby.

Figure 2:
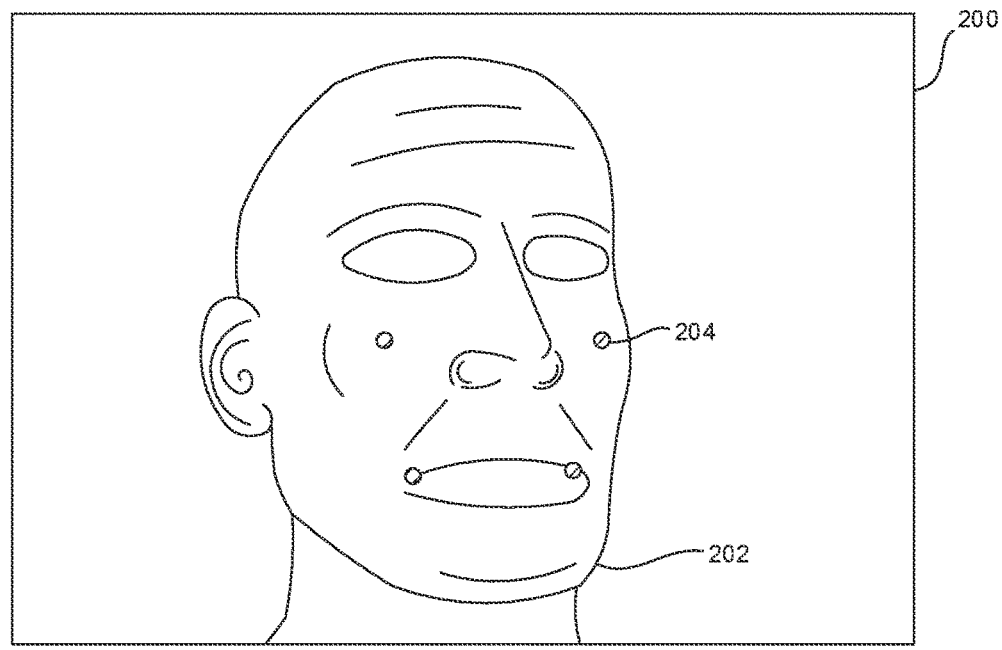
FIG. 2 is a screen shot of the face of an example computerized avatar.

FIG. 2 illustrates a display 200 such as any display herein on which a face 202 of a computer avatar is presented. The face 202 has many emulated anchor points 204 (only four shown for clarity) that can be animated as demanded by respective facial animation units (FAU) to emulate the relaxation or contraction of the corresponding part of a human face.

Figure 3:
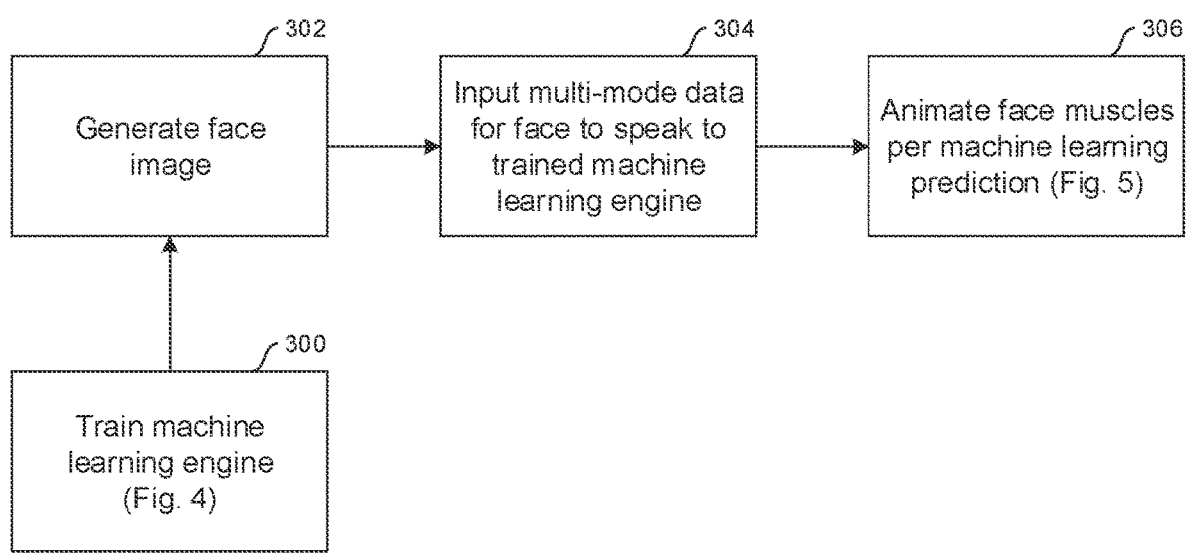
FIG. 3 illustrates overall example logic in example flow chart format.

FIG. 3 illustrates overall logic that may be employed to automatically generate FAUs to animate the face 202. The logic described herein may be executed by any one or more of the processors described herein.

Commencing at block 300, a machine learning (ML) engine is trained as will be described in reference to FIG. 4. Proceeding to block 302, the video image 202 of the face is generated by, e.g., a computer simulation such as a computer game and corresponding multi-modality data related to the face is input to the ML engine at block 304. From the multi-modality data, the ML engine generates predicted FAUs which are used at block 306 to animate the emulated muscles of the avatar face 202 as more fully described in reference to FIG. 5.

Figure 4:
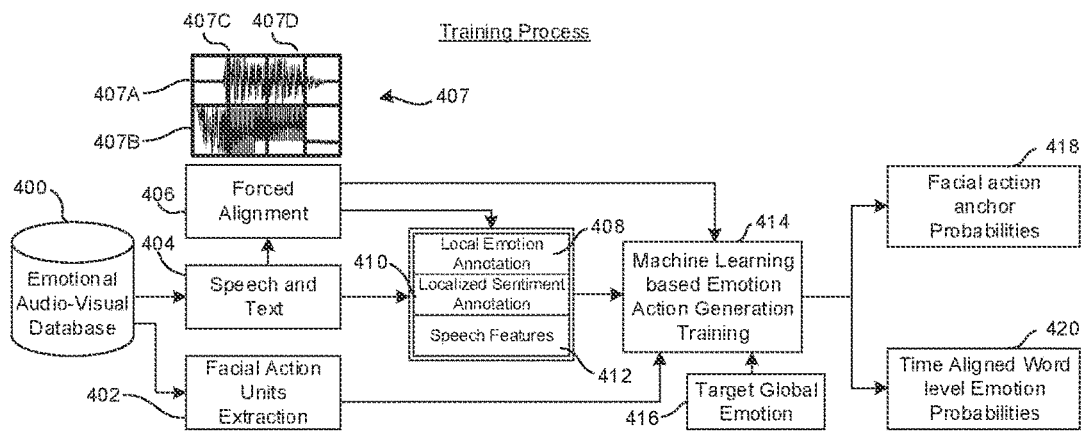
FIG. 4 illustrates the training process for the machine learning (ML) engine.

FIG. 4 illustrates an example training process for the ML engine. A training set of data from a database 400 is accessed. The training set of data includes images of faces expressing emotions while speaking. In other words, the database contains ground truth animations of avatars speaking known text while having correct expressions animated.

For each input training image, the respective anchor points 204 in the image are extracted from the image at block 402. In other words, block 402 generates the anchor points of the input image to be used for facial action units (FAUs). Also, speech signals and the text with which the speech signals are associated are extracted at block 404, it being understood that the speech and text at block 404 are associated with the FAU extracted at block 402.

Block 406 indicates that the speech and text are temporally aligned with each other as disclosed further below. As represented by the graph 407 in FIG. 4, phoneme boundaries are extracted from speech signals 407A phoneme boundaries of the corresponding text 407B. In this way, each incremental block along the x-axis represents a phoneme produced by the speech, with the phonemes being defined between adjacent boundaries 407C, 407D of the incremental blocks.

The forced alignment block 406, using the phoneme boundaries, aligns in time emotions in an emotion annotation block 408, sentiments in a sentiment annotation block 410, in which an expert annotates the inputs with a sentiment, and speech features in a speech feature block 412. Thus, corresponding emotions, sentiments and speech features are aligned using the extracted phoneme boundaries. As will be discussed further below, "sentiment" can refer to degree of emotion, e.g., positive, or negative, and "emotion" can refer to the emotional state of the speaker, e.g., happy, sad, angry, and so on. Note that a sliding window of words in the speech may be processed in this manner, e.g., words one through three may be annotated with a first emotion/sentiment, words two through four may be annotated with a second emotion/sentiment, and so on. Speech features 412 are generated to represent the combined characteristics of the input. Speech features may be generated using techniques including Wigner-Ville distribution functions and time-frequency filtering techniques.

The products of blocks 408, 410, and 412 are provided to a ML emotion action generation model 414 to train the model. Also input to the model 414 are the FAU from block 402 and a target emotion 416, which is ground truth of the input (annotated) emotion used to train the model 414. In this way, the model 414 is trained on multiple sets of data from the database 400 to correlate FAUs with corresponding speech and text and target emotion to be able to output facial action anchor probabilities 418 and time-aligned word level emotion probabilities 420 for subsequent use in animating a face (e.g., the face 202 in FIG. 2) by appropriately animating the anchor points 204 in accordance with the FAUs.

Figure 5:
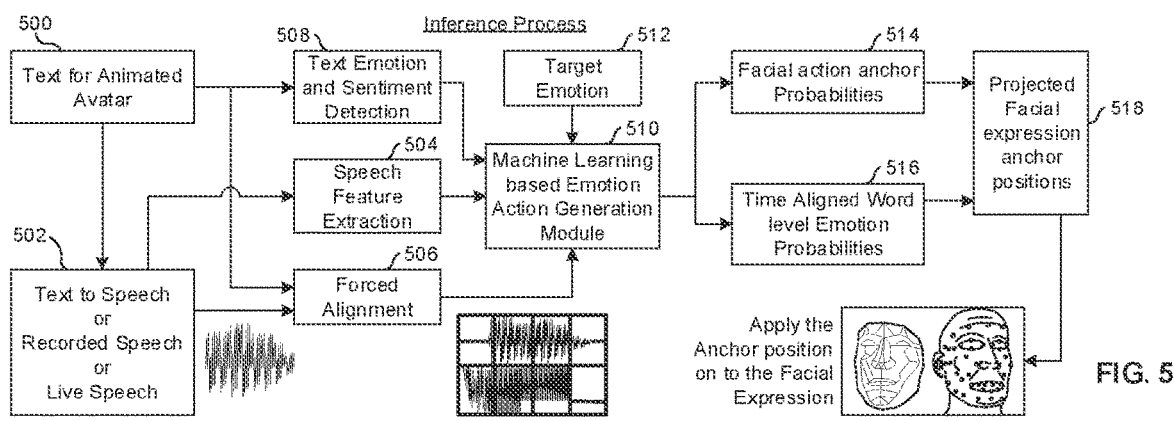
FIG. 5 illustrates the inference process for the ML engine.

Before moving on to FIG. 5, emotions may be detected in the input training set for comparison against ground truth 416 using one or both of categorical and dimensional emotion classification. Categorical classification produces emotion categories including happy, sad, angry, fear, etc. Dimensional classification produces emotion dimensions in terms of valance and arousal.

FIG. 5 illustrates subsequent inference processing by the model 414, labeled 510 in FIG. 5. Text 500 that an animated avatar is to speak is input to a text-to-speech block 502 to convert the text to speech signals. In addition, or alternatively, recorded, or live human speech corresponding the text may be supplied to block 502. The features of the speech are extracted at block 504, and the phoneme boundaries are extracted from the text and corresponding speech at block 506 in the same manner described for the training process of FIG. 4 as indicated by the graphs 507, which has the same features as the graph 407 in FIG. 4 for aligning in time the elements of blocks corresponding to those aligned as taught above in reference to FIG. 4.

The text that the avatar is to speak from block 500 is sent to an emotion and sentiment detection block 508 to extract sentiment and emotion from the text in accordance with the training from FIG. 4. The emotion and sentiment extracted from the text at block 508 are input to the model 510 along with the speech features from block 504 and aligned text/speech signals from block 506. If desired, a target emotion may be input to the model as indicated at block 512. The target emotion may be part of annotated text input by the user or derived from the input text using machine learning.

Based on its training, from the inputs it receives the model 510 outputs probabilities 512 for the facial actions for each anchor point 204 and probabilities 516 for the emotions derived from the time-aligned text/speech signals. Based on one or both of these probabilities, projected anchor positions 518 (i.e., FAUs) are obtained for establishing the facial expression each animated frame is to portray. The FAUs are applied to the animation of the avatar to give it the correct expression as it speaks the text input at block 500.

It will be appreciated that whilst present principals have been described with reference to some example embodiments, these are not intended to be limiting, and that various alternative arrangements may be used to implement the subject matter claimed herein.

What is claimed is:

1. An apparatus comprising:
at least one processor configured with instructions to:
identify an image of a face of a computerized avatar;
identify first modality data related to the avatar, the first modality data comprising speech;
identify second modality data related to the avatar, the second modality data comprising text;
receive first information based at least in part on the first modality data and second information based at least in part on the second modality data useful for animating the image of the face of the avatar; and
animate the face of the avatar in accordance with both the first and second information, wherein the instructions are executable to access at least one machine learning (ML) model to animate the face of the avatar, the ML model being executable to receive anchor points derived from an image of the face of the avatar to generate facial action units (FAUs) and to associate the speech and text with the FAU;
the instructions being executable to temporally align the speech and text with each other at least in part using phoneme boundaries extracted from the speech, the instructions being further executable to align in time emotions and degrees of emotions with the speech and text using the phoneme boundaries extracted from the speech.

2. The apparatus of claim 1, wherein the instructions are executable to derive the emotions from the first and second modality data.

3. The apparatus of claim 2, wherein the information is based at least in part on time-aligned word level emotion probabilities produced from the emotions.

4. A method, comprising:
generating an image of a first face to be animated to speak words in accordance with both first text and first speech;
aligning in time the first text and the first speech;
animating the image of the first face to speak first words in accordance with the first text and the first speech; wherein
the image of the first face is animated at least in part by processing a sliding window of words in the first speech such that words 1 through N in the first speech are associated with at least a first emotion and the image of the first face is animated according to the first emotion, and words 2 through N+M in the first speech are associated with at least a second emotion and the image of the first face is animated according to the second emotion, wherein N is an integer greater than two and M is an integer.

5. The method of claim 4, comprising:
training a machine learning (ML) model using a training set of animated faces speaking known words;
inputting the first text and first speech to the ML model;
animating the image of the first face in accordance with output of the ML model;
detecting emotion and sentiment from the first text;
aligning the first text with speech representing the first text to render aligned text/speech; and
inputting the emotion, sentiment, and aligned text/speech to the ML model.

6. The method of claim 5, comprising:
inputting a target emotion to the ML model.

7. The method of claim 5, comprising:
receiving first probabilities from the ML model representing facial action.

8. The method of claim 7, comprising:
receiving second probabilities from the ML model representing emotion.

9. The method of claim 8, comprising:
using one or both of the first and second probabilities to establish facial action units (FAU).

10. The method of claim 9, comprising:
animating the image of the first face in accordance with the FAU.

11. An assembly comprising:
at least one display configured to present an animated computer avatar;
at least one processor configured with instructions to execute a machine learning (ML) model, the instructions being executable to:
receive text indicating speech to be spoken by the avatar;
receive speech;
align the text and the speech in time at least in part using phoneme boundaries extracted from the speech, the instructions being further executable to align in time emotions with the speech and text using the phoneme boundaries extracted from the speech;
process the text and speech using the ML model to generate facial action units (FAU); and
animate the computer avatar in accordance with the FAU.

12. The assembly of claim 11, wherein the instructions are executable to:
detect emotion and sentiment from the text;
align the text with speech representing the text to render aligned text/speech; and
inputting the emotion, sentiment, and aligned text/speech to the ML model.

13. The assembly of claim 12, wherein the instructions are executable to:
input a target emotion to the ML model.

14. The assembly of claim 11, wherein the instructions are executable to:
receive first probabilities from the ML model representing facial action.

15. The assembly of claim 14, wherein the instructions are executable to:
receive second probabilities from the ML model representing emotion.

16. The assembly of claim 15, wherein the instructions are executable to:
use the first and second probabilities to establish the FAU.

* * * * *